(12) United States Patent
Ishibashi et al.

(10) Patent No.: US 7,149,910 B2
(45) Date of Patent: Dec. 12, 2006

(54) APPARATUS FOR PROCESSING A SET OF INSTRUCTIONS INITIALLY AT A LOW SPEED FOR A PREDETERMINED TIME THEN PROCESSING THE SET OF INSTRUCTIONS AT A HIGHER SPEED UNTIL COMPLETION

(75) Inventors: Koichiro Ishibashi, Warabi (JP); Naohiko Irie, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 606 days.

(21) Appl. No.: 10/163,314

(22) Filed: Jun. 7, 2002

(65) Prior Publication Data

US 2002/0194513 A1 Dec. 19, 2002

(30) Foreign Application Priority Data

Jun. 19, 2001 (JP) ............................. 2001-184224

(51) Int. Cl.
*G06F 1/26* (2006.01)
*G06F 9/46* (2006.01)

(52) U.S. Cl. .................. 713/322; 713/300; 713/320; 718/100; 718/102; 718/103

(58) Field of Classification Search ................ 718/100, 718/102, 103, 106, 107; 713/300, 310, 313, 713/320, 322, 324, 323
See application file for complete search history.

(56) References Cited

U.S. PATENT DOCUMENTS 5,021,679 A * 6/1991 Fairbanks et al. ............. 307/66
5,630,110 A * 5/1997 Mote, Jr. ..................... 713/501
5,875,120 A * 2/1999 Matsushima et al. ......... 713/321
5,875,348 A * 2/1999 Matsushima et al. .......... 710/4
6,000,035 A * 12/1999 Matsushima et al. ........ 713/320
6,298,448 B1 * 10/2001 Shaffer et al. .............. 713/322
6,425,086 B1 * 7/2002 Clark et al. ................. 713/322
6,462,723 B1 * 10/2002 Yamazaki et al. ............ 345/82
6,496,445 B1 * 12/2002 Lee ............................ 365/233
6,535,986 B1 * 3/2003 Rosno et al. ................ 713/400
6,603,453 B1 * 8/2003 Yamazaki et al. ............ 345/92
6,785,829 B1 * 8/2004 George et al. .............. 713/320

OTHER PUBLICATIONS

"Real-Time Dynamic Voltage Scalling for Low-Power Embeded Operating Systems", Padmanabhan Pillai and Kang G. Shin, Real-Time Computing Library, Oct. 2001, ACM SIGOPS Oper. Sys. Rev. Procs. of the eighteenth ACM sym on Operating Sys. vol. 35, Iss. 5.*

(Continued)

*Primary Examiner*—Thomas Lee
*Assistant Examiner*—Mark Connolly
(74) *Attorney, Agent, or Firm*—Miles & Stockbridge P.C.

(57) ABSTRACT

A semiconductor device and the operation control method thereof are provided, which realize a highly generalized frequency control mechanism so as to allow a microprocessor to operate in lower power consumption, but with higher performance, without depending on the OS.

It is arranged such that where the jobs are executed, they start at a lower frequency and if the execution of said jobs continues at the elapse of the time as predetermined, they are automatically executed at a higher frequency.

16 Claims, 9 Drawing Sheets

OTHER PUBLICATIONS

"Usinf Variable-MHz Microprocessor to Efficiently Handle Uncertainty in Real-Time Systems", Eric Rotenberg, Center for Embeded Systems Research, Dept. of Elec. and Comp. Eng., North Carolina State Univ., 2001 IEEE.*

Schuster et al., "Asynchronous Interlocked Pipelined CMOS Circuits Operating at 3.3-4.5GHz," 2000 IEEE International Solid-State Circuits Conference, Digest of Technical Papers, pp. 292-293.

* cited by examiner

APPARATUS FOR PROCESSING A SET OF INSTRUCTIONS INITIALLY AT A LOW SPEED FOR A PREDETERMINED TIME THEN PROCESSING THE SET OF INSTRUCTIONS AT A HIGHER SPEED UNTIL COMPLETION

FIELD OF THE INVENTION

The present invention relates to a microprocessor and a control method of the same.

BACKGROUND OF THE INVENTION

In recent years, the high-speed operation of a microprocessor is remarkable, which operation speed has increased twice as high as it was one year ago or so. In turn, the problem of the increased power consumption according to such high-speed operation has come to surface. Especially, in the cases where the microprocessor is utilized for hand-held equipments, the increased power consumption of the same shortens the duration of the batteries in use. The hand-held equipments attach importance to extending the batteries life, so that the power consumption of the processor is reduced by operating the microprocessor thereof in a lower frequency than the highest one available to the microprocessor. However, this does not allow the microprocessor to execute a high-level information processing.

Against the above inconvenience, a method to enhance the performance of the microprocessor is proposed wherein the power consumption thereof is reduced by decreasing the supply voltage and the frequency thereof where the task that the processor has to execute is of low load while by increasing the supply voltage and the frequency thereof where that is of high load.

One example of such conventional method as mentioned above is disclosed in page 292 to 293 of 2000, IEEE International Solid-State Circuits Conference, Digest of Technical Papers, which method is characterized in that the frequency and supply voltage of the microprocessor are controlled in accordance with the cut-offs as requested by the applications that the microprocessor executes and that an operating system (hereinafter referred to as OS) is utilized for assigning a frequency as required so as to constitute a system comprising a circuit, a power source and so forth for generating a supply voltage capable of executing such frequency as required.

The above prior art, as the OS is utilized for assigning an optimum frequency, occurs the following problems.

(1) The calculation function to generate a controlled optimum frequency is required for the OS. The microprocessor runs the OS itself, which causes control-related overhead to the microprocessor so as to increase its power consumption.

(2) The control method as mentioned above requires the cooperation of microprocessor and the OS, which do not operate unless both of them correspond to the same supply-voltage frequency control system. In fact, there are found the variety of the operating systems and the microprocessors on the market, which are utilized for the variety of equipments. It is predicted that the general application of such control method to such various operating systems and microprocessors may cause a problem relating to standardization.

SUMMARY OF THE INVENTION

Thus, it is an object of the present invention is to realize a highly generalized frequency control method of the microprocessor without depending upon the OS so as to enable both the lower power consumption and higher performance thereof.

For that purpose, the present invention utilizes the following means.

A semiconductor device comprises a processor to execute jobs in which a plurality of instructions are sequentially performed and a control unit to control an operation mode of the processor. The control unit sets the operation mode of the processor to a first mode and sets the same to a second mode after a certain elapse of time from the beginning of the execution of the jobs by the processor. The processor in the second mode operates higher than the operating speed of that in the first mode, which is realized by making higher the operating frequency of the second mode thereof than that of the first mode thereof or by making higher the operating frequency and the supply voltage of the second mode than those of the first mode thereof or by making higher the operating frequency of the second mode thereof as well as smaller the absolute value of the substrate bias of the second mode thereof than those of the first mode thereof.

Further, it is arranged such that the control unit detects the status of the processor in accordance with its pointer's address and the control signal that is output to a clock distribution circuit so as to control the operating mode thereof irrelevant of an OS in operation under the processor.

Further, information on a given time during which the first mode thereof changes to the second mode thereof is stored in either an external ROM or a non-volatile memory, which information is transferred to a register of the control unit at the start of the power supply or at the resetting of the system so as to make the above given time appropriate to the applications that the processor shall operate.

DETAILED DESCRIPTION OF THE PREFERRED EMBODIMENTS

Hereinafter, the preferred embodiments of the present invention are described in more details with reference to the accompanying drawings.

Figure 1:
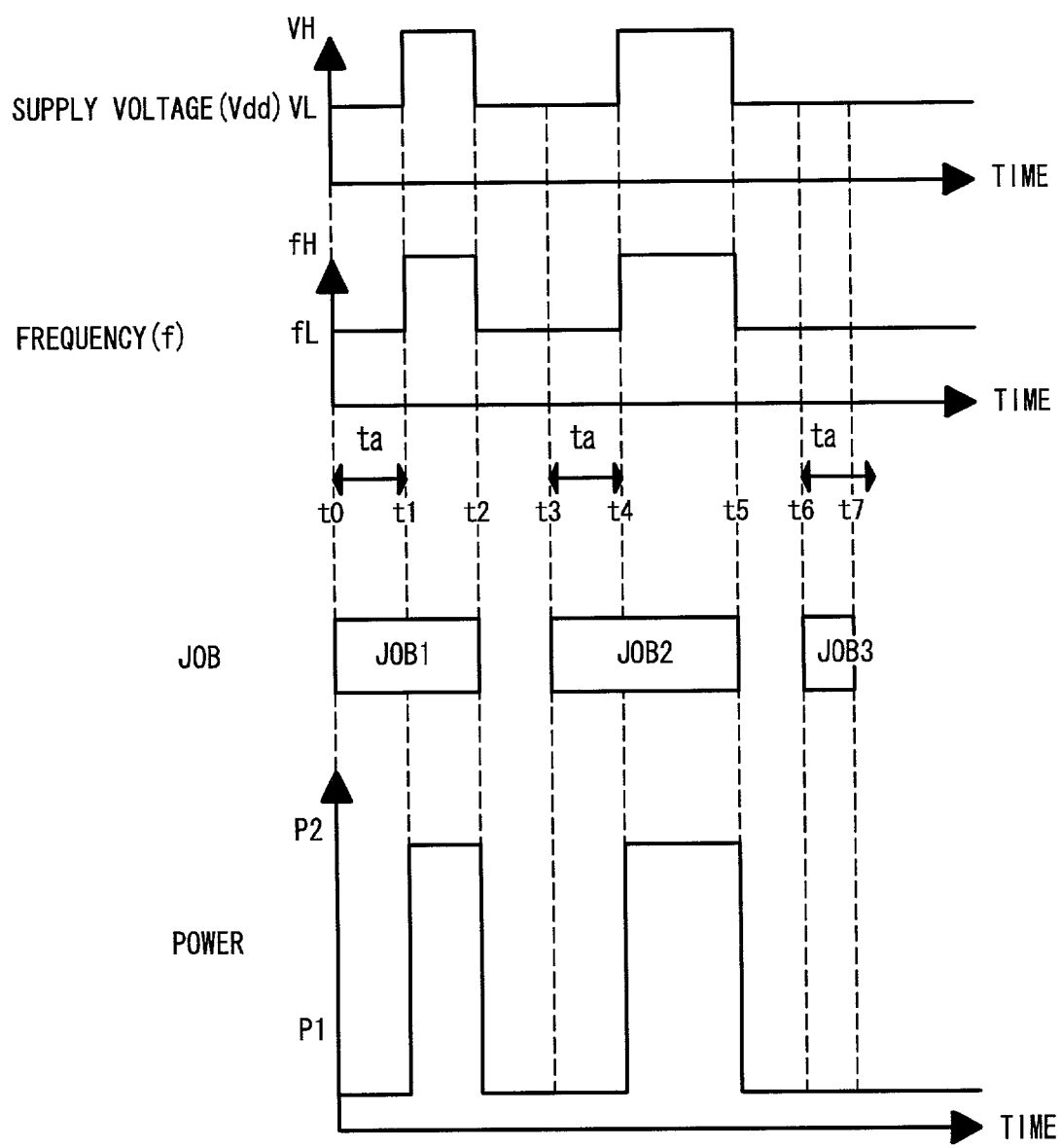
FIG. 1 is a waveform to show an example of the supply voltage-frequency control according to the first embodiment of the present invention.

FIG. 1 is a waveform to show an example of controlling both the supply voltage and the frequency of the processor according to the first embodiment of the present invention. In this example, the processor executes a job 1, a job 2 and a job 3, which jobs here signify a series of instruction sequence that are executed by the processor.

The processor starts executing the job 1 at a time t0 when the processor starts to operate at a lower operating frequency fL and a lower supply voltage VL. Thereafter, at a time t1 to which a given time ta has passed, the processor detects the lapse of the time ta so as to change the supply voltage and frequency thereof. After the time t1, the processor executes the job 1 at a higher operating frequency fH and a higher supply voltage VH. The job 1 ends at a time t2. Likewise, the processor starts executing the job 2 starts at a time t3 at the frequency fL and the supply voltage VL. Thereafter, at a time t4 to which the time ta has passed, the processor executes the job 2 at the frequency fH and the supply voltage VH. The job 2 ends at a time t5. Then, the job 3 starts at a time t6, which job starts operating at the frequency fL and the supply voltage VL and ends before the time ta elapses. That is to say, the job 3 ends at the time t6 without being subjected to the alteration of the frequency and the supply voltage to fH and VH, respectively.

The power consumption of the processor according to this embodiment is shown in Figure. Providing that the power of a CMOS circuit is P, the power consumption is in proportion to the multiplication of the frequency by the root of the voltage, which it is known is represented as $P \propto f*V^2$ As one example, it is assumed that the relation in which the VH is equal to 2VL and the fH is equal to 2fL stands.

In this case, the power consumption P1 of the processor that operates at the operating frequency fL and the supply voltage VL is represented as $P1 \propto fL*VL^2$ while that P2 thereof operating at the operating frequency fH and the supply voltage VH is represented as $P2 \propto fH*VH^2$, which is equal to $2fL*(2VL)^2$ so as to result in 8PI. In this way, the power consumption P1 is one-eighth as large as the P2. The power consumption is reduced just in proportion to the operating frequency as reduced in the case where only the frequency is reduced without reducing the supply voltage, which results in the P1 being half as large as the P2, so that the simultaneous control of both the supply voltage and operating frequency of the processor is effective for the reduction of its power consumption. According to this control method, the longer the duration of the power consumption P1 becomes, the smaller the average consumption becomes. Here, the state in which the processor operates under the power consumption P1 is defined as a low power mode while the sate in which it operates under the power consumption P2 is defined as a high-speed mode.

According to the above control method, the low power operating mode and the high-speed mode are divided by setting a predetermined time ta. At the start of executing a job, the processor is in the low power mode. A comparatively lighter job is complete for a short time under the low power mode so as to make the power consumption of the processor smaller. On the other hand, in the case of a heavier job, such job does not end during the time ta when the processor is in the low power mode, so that the low power mode automatically changes to the high-speed when the given time ta has come. Thus, the processor operates at a higher frequency in the case of such heavier job so as to avail its maximum performance. The jobs may be executed without intermission for making the most of the capability of the processor so as to keep the processor in the high-speed mode.

Figure 2:
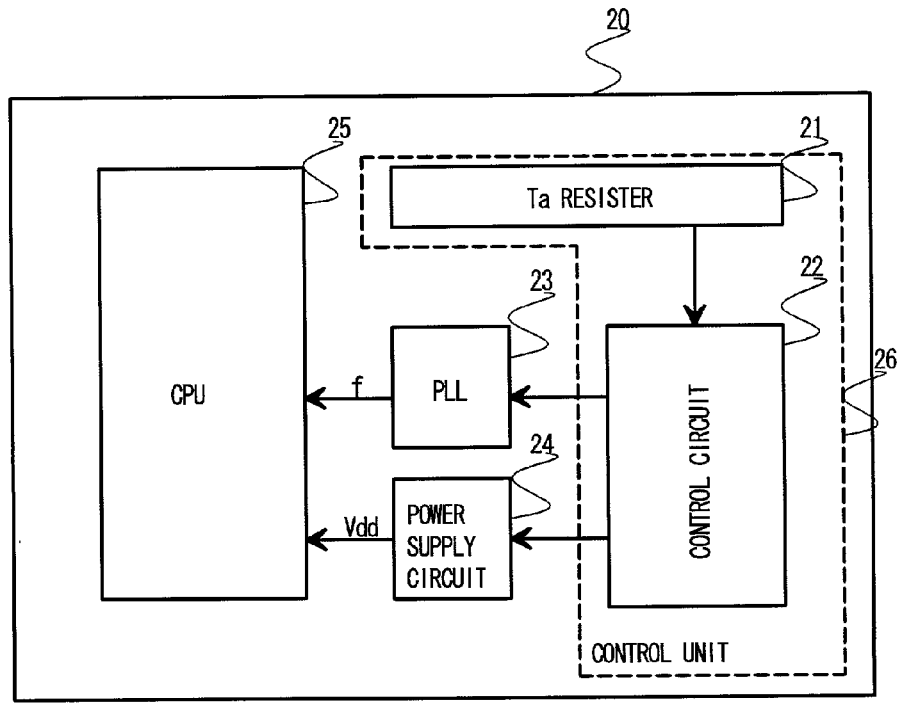
FIG. 2 is a view of an arrangement of hardware implementing the present invention.

The information on the time ta may be stored in the register and so forth within a semiconductor integrated circuit. The hardware thereof monitors the elapse of the time ta so as to change the low power mode of the processor to the high-speed mode thereof, which facilitates the microprocessor to operate under lower power consumption and at a higher performance. FIG. 2 shows an arrangement of such hardware as mentioned above.

A semiconductor integrated circuit 20 comprises a processor (CPU) 25 to execute software, a control unit 26 to control the operating mode of the processor, a clock distribution circuit 23, which circuit is represented by a PLL and hereinafter referred to as PLL and a power supply circuit 24. Further, the control unit 26 comprises a ta register 21 to keep information on a time ta, a control circuit 22 to control the PLL 23 and the power supply circuit 24. The control circuit 22 monitors the state where the job is executed and controls the PLL 23 and the power supply circuit 24 at the beginning of the job so as to make the operating frequency f of the processor fL and the supply voltage Vdd thereof VL. Then, the control circuit 22 compares the time ta as kept in the ta register 21 with the execution time of the job and controls the PLL 23 and the power supply circuit 24 when the execution time of the job has come to ta so as to be the frequency and the supply voltage thereof fH and VH, respectively. The frequency fH and the supply voltage VH are returned to the original fL and VL, respectively at the completion of the job.

Figure 3:
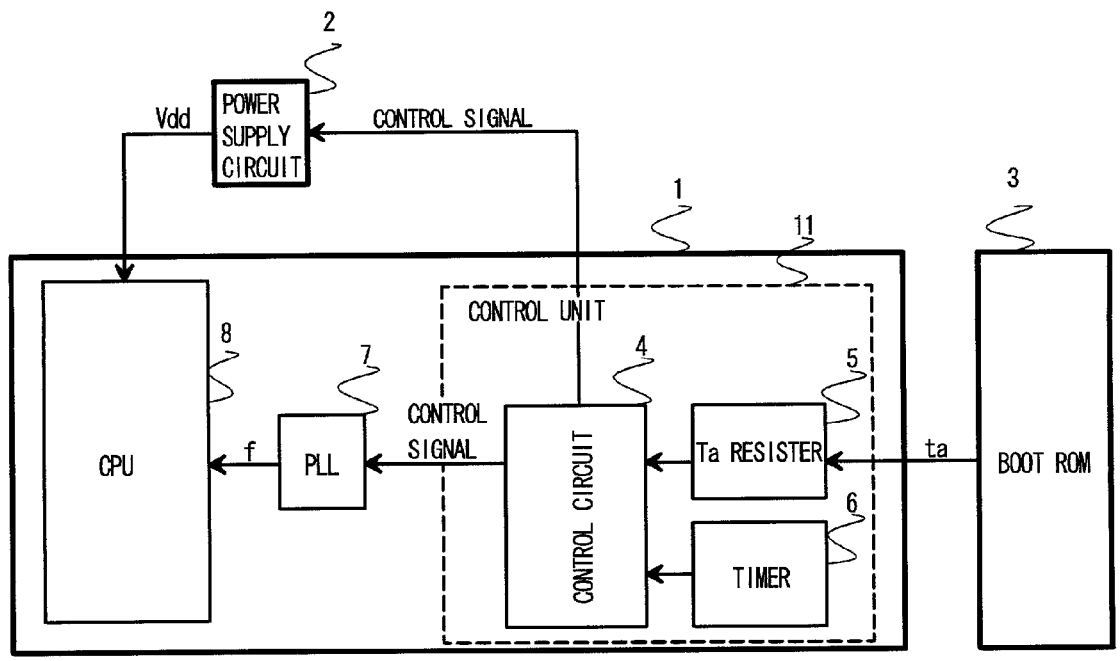
FIG. 3 is a view of another arrangement of the hardware implementing the present invention.

To note, the power supply circuit 24 is not necessarily within the semiconductor integrated circuit, which may be replaced with a power supply circuit capable of controlling the output voltage. FIG. 3 shows another arrangement of such hardware as mentioned above. Herein, the arrangement of the hardware is shown in details wherein reference numerals 1, 2 and 3 indicate a semiconductor integrated circuit device, a power supply circuit and a boot ROM, respectively.

The control method of the system is the same as that shown in FIG. 2. In this arrangement, the power supply circuit 2 exists independently from the semiconductor integrated circuit device 1. The control circuit 4 of the device 1 transmits a control signal to the power supply circuit 2 so as to control the supply voltage Vdd as generated from the power supply circuit 2. Further, in this arrangement, the boot ROM 3 is connected to the semiconductor integrated circuit device 1, wherein the boot ROM 3 takes in information as required for the semiconductor device 1 at the start of the circuit system. The information on the time ta is stored in the boot ROM 3, which information is input to a Register 5 at the start of the power supply to the system or at the resetting thereof. It should be noted that the ta may be of time information or of the number of clock signals wherein the former is measured by a timer 6 while the latter is measured by a counter that is not shown in the drawing. This arrangement allows the operation control of the semiconductor device according to the present invention to be executed without depending on the OS that is later installed in a memory and so forth of the semiconductor integrated circuit device 1.

Here, it is general that a non-volatile memory such as EEPROM is adopted for the boot ROM, but any non-volatile memory media including a flush memory, a battery backed-up RAM, a floppy disk or a hard disk and so forth will do, if it the contents are automatically loaded therein at the start of the circuit system. Further, in FIG. 3, the boot ROM is not within the semiconductor device 1, but the non-volatile memory such as a flush memory or the battery backed-up RAM that are formed on the semiconductor device 1 may function as the boot ROM.

Figure 4:
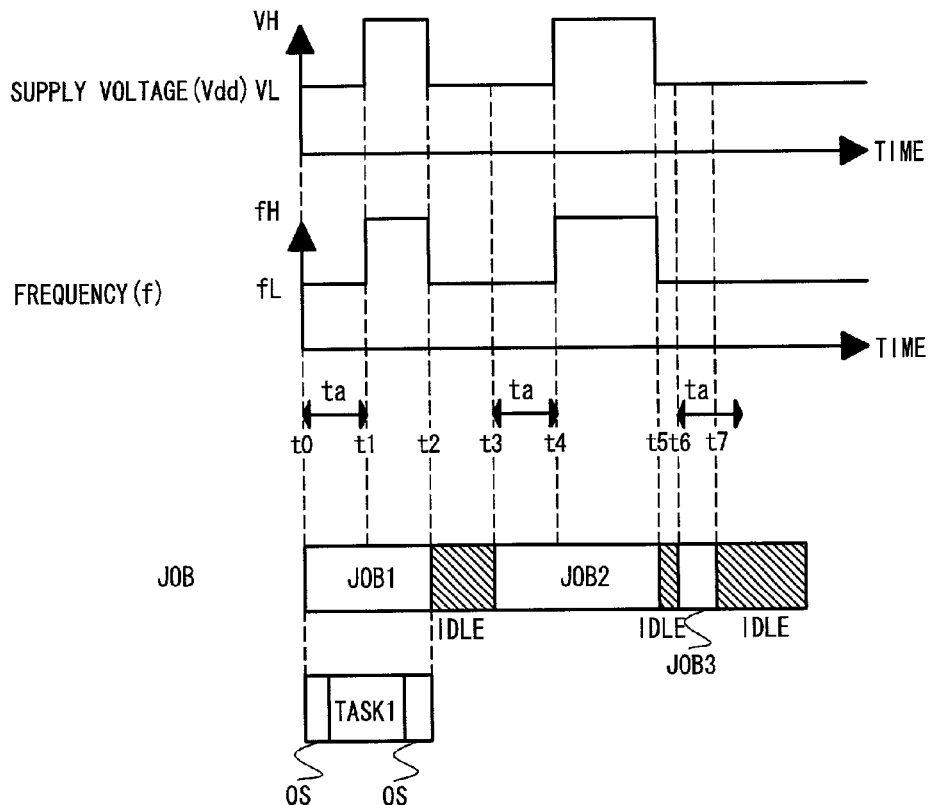
FIG. 4 is a waveform to show another example of the supply voltage-frequency control according to the first embodiment of the present invention.

FIG. 4 is a waveform to show another example of the supply voltage-frequency control according to the present embodiment.

According to the present invention, the supply voltage and frequency control of the processor is carried out per job unit. Where the microprocessor also executes the OS, the contents of the job include a task to execute applications and the execution of the OS that is carried out before and after such task. That is to say, as shown in FIG. 4 with respect to a job 1, at which job the processor to begin with executes the OS and then executes a task of application by the instruction of the OS. At the completion of the task, the operation control returns to the OS for the execution of the same. Thereafter, where there is no job to be executed, the OS works to put the processor into idle state, in which state the pointer of the processor continues accessing a specific memory address. It requires interruption to return from this state.

Figure 5:
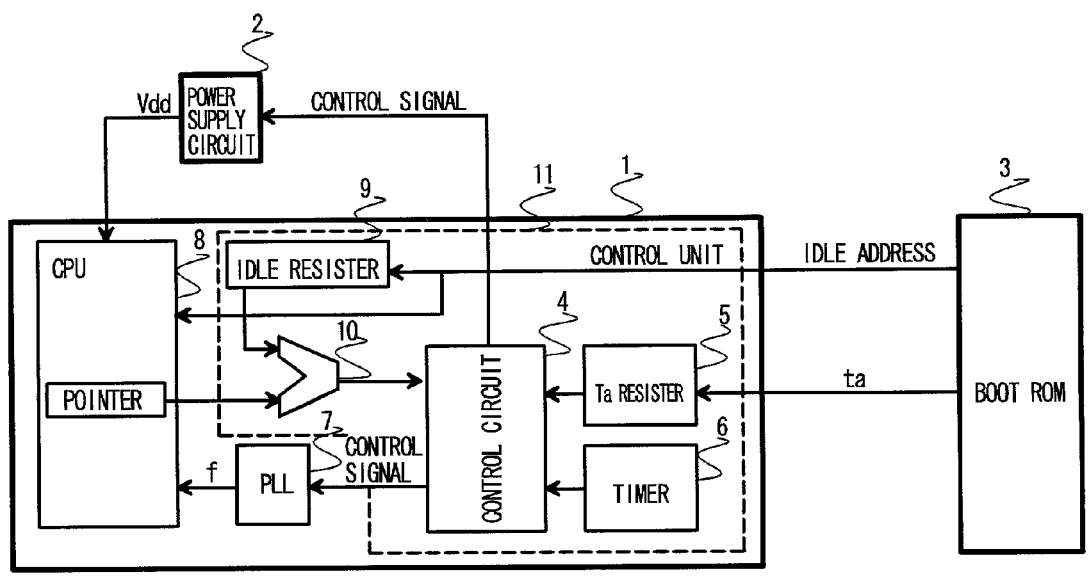
FIG. 5 is a view of another arrangement of the hardware implementing the present invention.

FIG. 5 is a view of the arrangement of the hardware of the circuit system to realize the waveform as shown in FIG. 4 without the operation of the OS.

In the hardware as shown in FIG. 5, in addition to the arrangement as shown in FIG. 3, an idle register 9 and a comparator 10 are inserted to the semiconductor integrated circuit device.

The operation according to this embodiment is as follows. At the start of the circuit system, an idle address is loaded to the idle register 9 and the processor 8 from the boot ROM 3 while a value of the time ta is loaded to the ta register 5. The processor 8 begins to execute the job 1 at the time t0 when the processor carries out the job 1 at a lower operating frequency fL and a lower supply voltage VL. The job 1 includes the execution of the OS, the task 1 and the OS in this sequence, which contents the hardware can't distinguish from one another. After the start of the job 1, the control circuit 4 begins to measure the time passed during the job by the timer 6. At the time t1 when the given time ta has passed, the control circuit 4 changes the supply voltage Vdd and the clock frequency f of the processor, which processor executes the job 1 at a higher operating frequency fH and a higher supply voltage VH. Upon the completion of the job 1 at the time t2, the Os designates the idle state so as to put the processor into the idle state, wherein the processor is put into the idle state such that the OS sets the pointer of the processor to the idle address as preliminarily input from the boot ROM 3. Accordingly, the control circuit 4 confirms that the address as stored in the idle register corresponds to that as designated by the pointer so as to determine that the processor is put into the idle state. Upon such confirmation, the control circuit 4 reduces the frequency f and the supply voltage Vdd to fL and VL, respectively so as to put the semiconductor integrated circuit device into low power mode. At the start of the following job 2, the pointer designates an address different from that for the idle state, which address is detected by the comparator 10 while the control circuit 4 starts to measure the job execution time. The completion of the job 2 as well as the start of the job 3 and the completion thereof are also confirmed in the same way as for the job 1.

The above arrangement allows the idle state of the processor to be determined without depending on the OS so as to realize the low power operation of the same according to the present invention.

Figure 6:
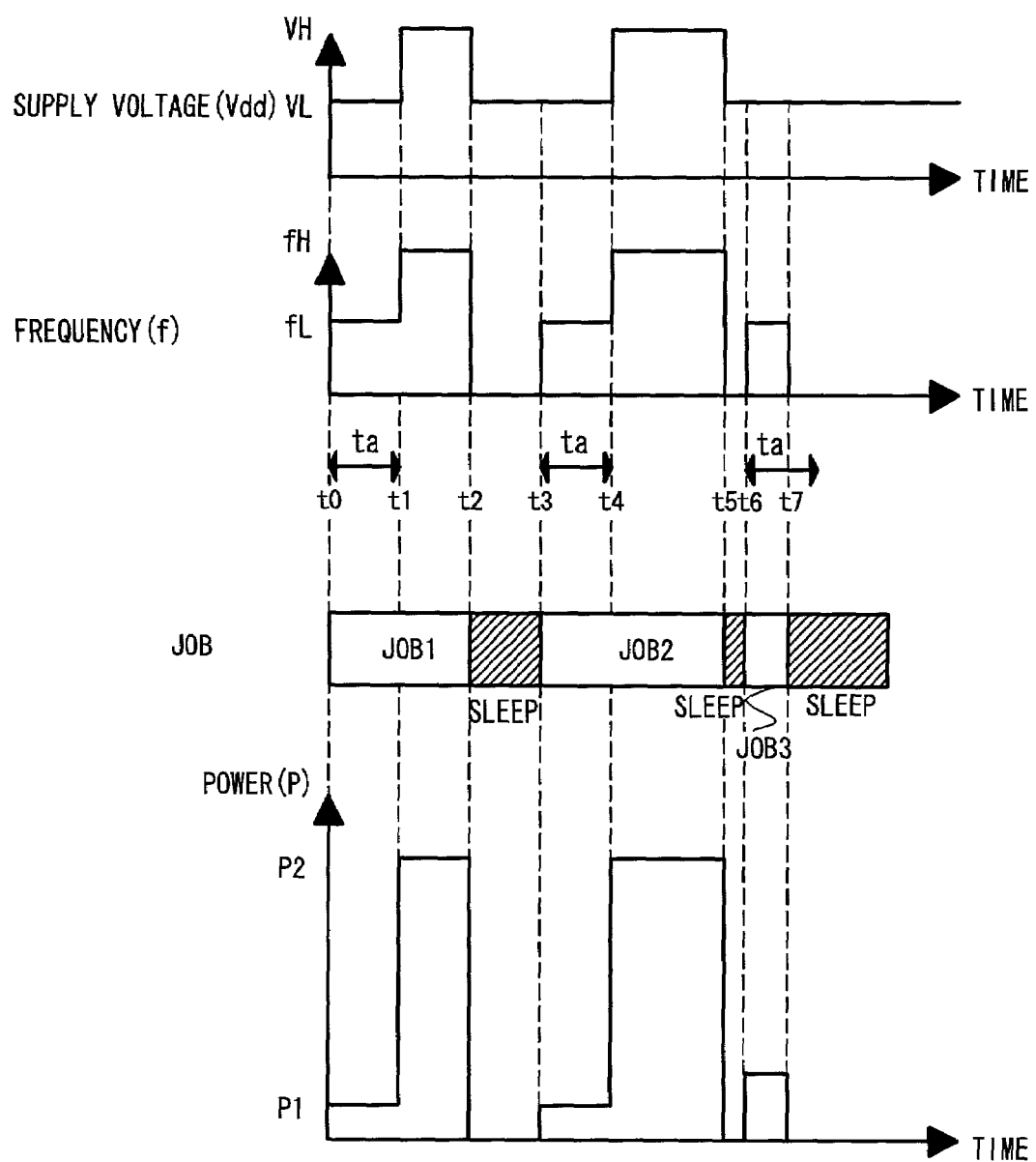
FIG. 6 is a waveform to show another example of the supply voltage-frequency control according to the first embodiment of the present invention.

FIG. 6 is a waveform to show another example of the supply voltage-frequency control according to the first embodiment. The example shows the case where the processor is put into sleep status at the completion of the job. The sleep status means that the processor 8 halts the PLL so as to stand by for interruption. In this status, the clock is stopped during which there is no power consumption so as to further reduce the power as a whole than the case where the processor is in the idle state, which effect is as shown in the power graph.

Figure 7:
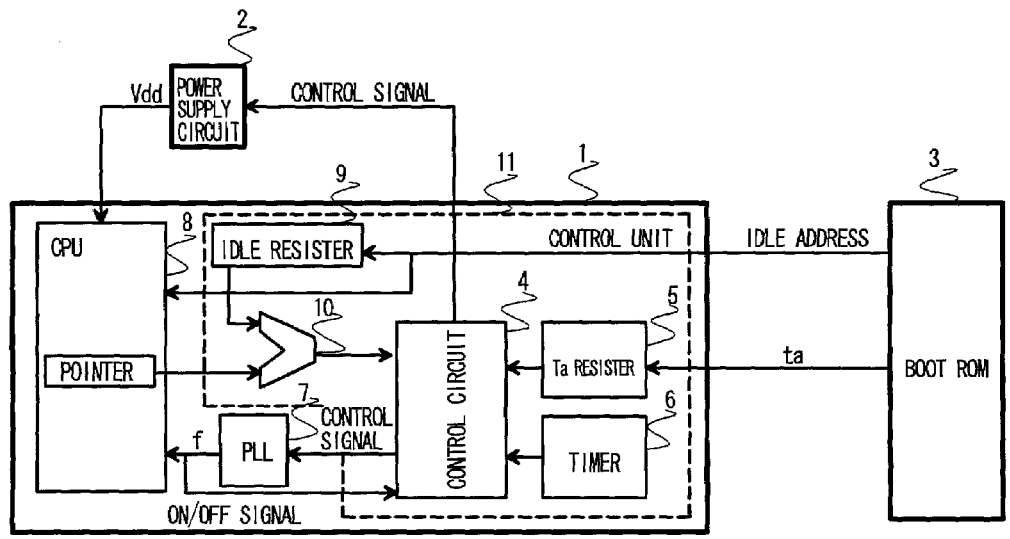
FIG. 7 is a view of another arrangement of the hardware implementing the present invention.

FIG. 7 is a view of the arrangement of the hardware of the circuit system to realize the waveform as shown in FIG. 6 without the operation of the OS.

The hardware arrangement as shown therein is almost the same as that shown in FIG. 5, but an on/off signal of the PLL 7 that the processor 8 generates is input to the control circuit too. This signal allows whether the processor is in the sleep status to be confirmed. Accordingly, the control circuit 4 determines that the job starts when the PLL 7 is switched on so as to control the power supply circuit 2 and the PLL 7 such that the supply voltage and the frequency thereof increase when a given time ta has passed. To note, when the processor stands by in the sleep status, only the clock distribution may be halted without halting the PLL 7 so as to return to the normal condition as quickly as possible, though it results in lowering the effect of low power consumption. The same hardware arrangement as shown herein may utilize a control signal to effect such change, which is also applicable to the examples as shown below.

Figure 8:
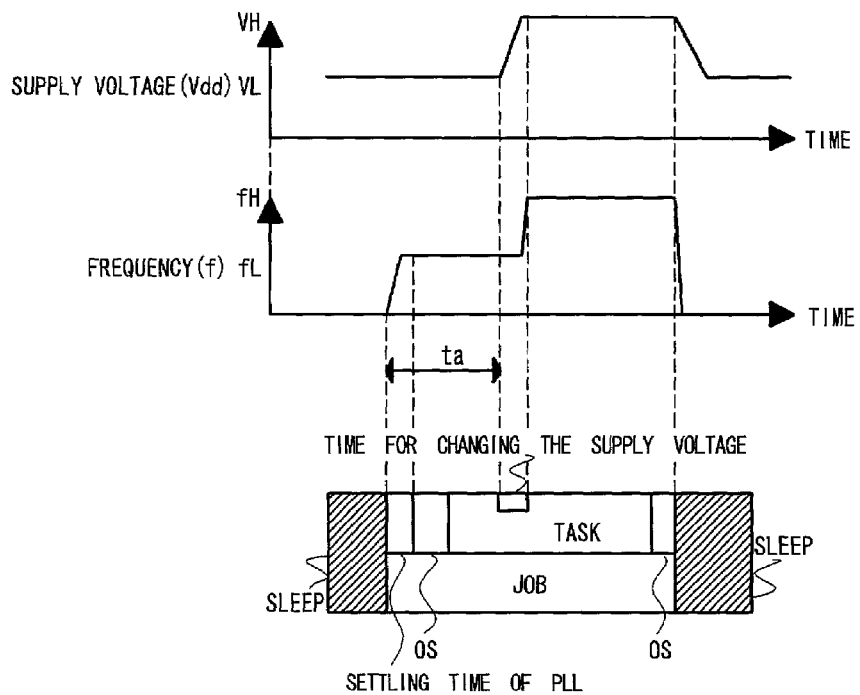
FIG. 8 is a detailed waveform to show the supply voltage-frequency control according to the first embodiment of the present invention.

FIG. 8 is a detailed waveform of the supply voltage-frequency control of the present embodiment in view of the operational characteristic of the respective circuits of the semiconductor device. As shown therein, one job consists of the settling time of the PLL, the execution of the OS, the execution of the task at the lower frequency fL, the change of the supply voltage during the execution of the task at the lower frequency fL, the execution of the task as the higher frequency fH and the execution of the OS.

When the processor is in the sleep status, the supply voltage thereto amounts to VL and the PLL is in halt, which state is interrupted by the operation of the PLL. In the hardware arrangement as shown in FIG. 7, the control circuit receives the control signal from the PLL, so that the same circuit starts to measure the job execution time by a counter upon the occurrence of such interruption. However, normally, the operation of the PLL is not stabilized at a moment, but requires the settling time in the order of several tens microsecond. During this settling time, the frequency thereof is set at fL. After the settling time has passed, the OS is executed at fL. Thereafter, the task as issued from the OS is executed, which task is initially executed at the frequency fL, but where the job continues after the given time ta has passed. Firstly, the supply voltage is changed from VL to VH by a signal from the control circuit 4. Secondly, when the supply voltage is stabilized at VH, the operating frequency is changed from fL to fH. This allows the malfunction that is generated by feeding the lower supply voltage VL to the processor while by driving the same at the higher frequency fH to be prevented. At the completion of the task, the OS continues operating at the frequency fH and the instruction of the OS puts the processor into the sleep status.

The supply voltage-frequency control as described above allows the operation of the processor to operate in accordance with the characteristic of the respective circuits integrated in the semiconductor device.

Figure 9:
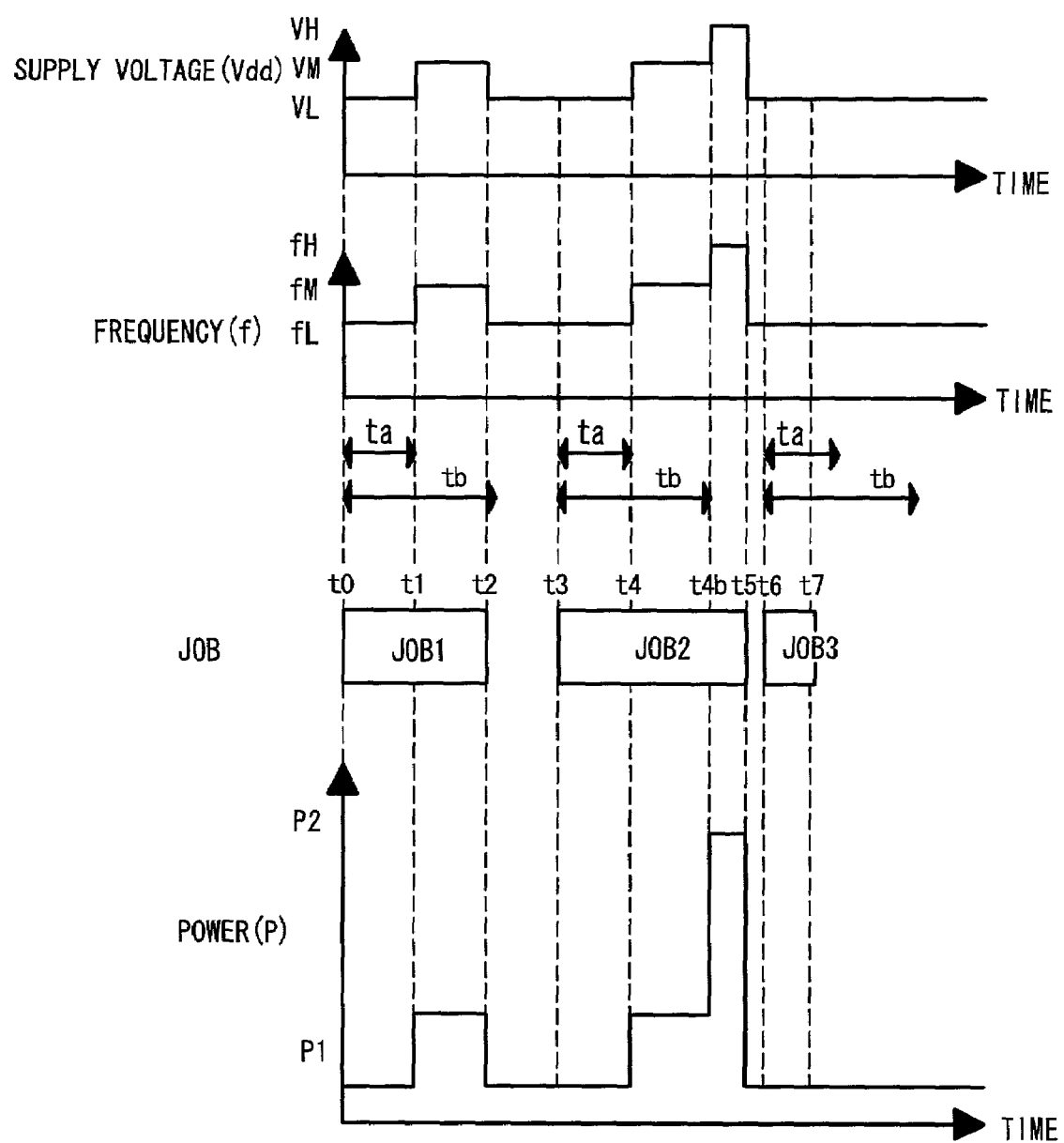
FIG. 9 is a waveform to show another example of the supply voltage-frequency control according to the first embodiment of the present invention.

FIG. 9 is a waveform to show another example of the supply voltage-frequency control according to the present embodiment. The waveform shows the case where there are three kinds of frequency, fL, fM and fH to correspond to as many kinds of supply voltage, VL, VM and VH. Thus, the present invention is not limited to two kinds of supply voltage and frequency as shown in the above examples. In this case, the time ta is preliminarily set, during which the processor operates at the frequency fL and the supply voltage VL while the time tb is set beforehand, during which the processor operates at the frequency of fL and fM as well as at the supply voltage of VL and VM. As shown in the waveform, at the time t0, the job starts at the frequency fL and the supply voltage VL. Thereafter, as the job 1 does not end after the time ta has passed, the processor continues to operate at the frequency fM and the supply voltage VM this time, at which frequency and supply voltage the processor ends operating. At the time t3, the following job 2 starts at the frequency fL and the supply voltage VL in the same way as for the job 1. Afterwards, as the job does not end after the time ta has passed, the processor continues operating at the frequency fM and the supply voltage VM this time. Then, as the job does not end after the time tb as preliminarily set has passed, the processor continues operating at the frequency fH and the supply voltage VH so as to end the job 2. The increase of the kinds of the frequency and the supply voltage allows the operation control to be finely adjusted. The number of the kinds of the frequency and that of those of the supply voltage does not necessarily correspond to each other. However, as described above with respect to FIG. 8, it is required to set a mode (combination of the supply voltage and the frequency) such that a higher frequency than the operating frequency available to the supply voltage as supplied is not supplied thereto.

Figure 10:
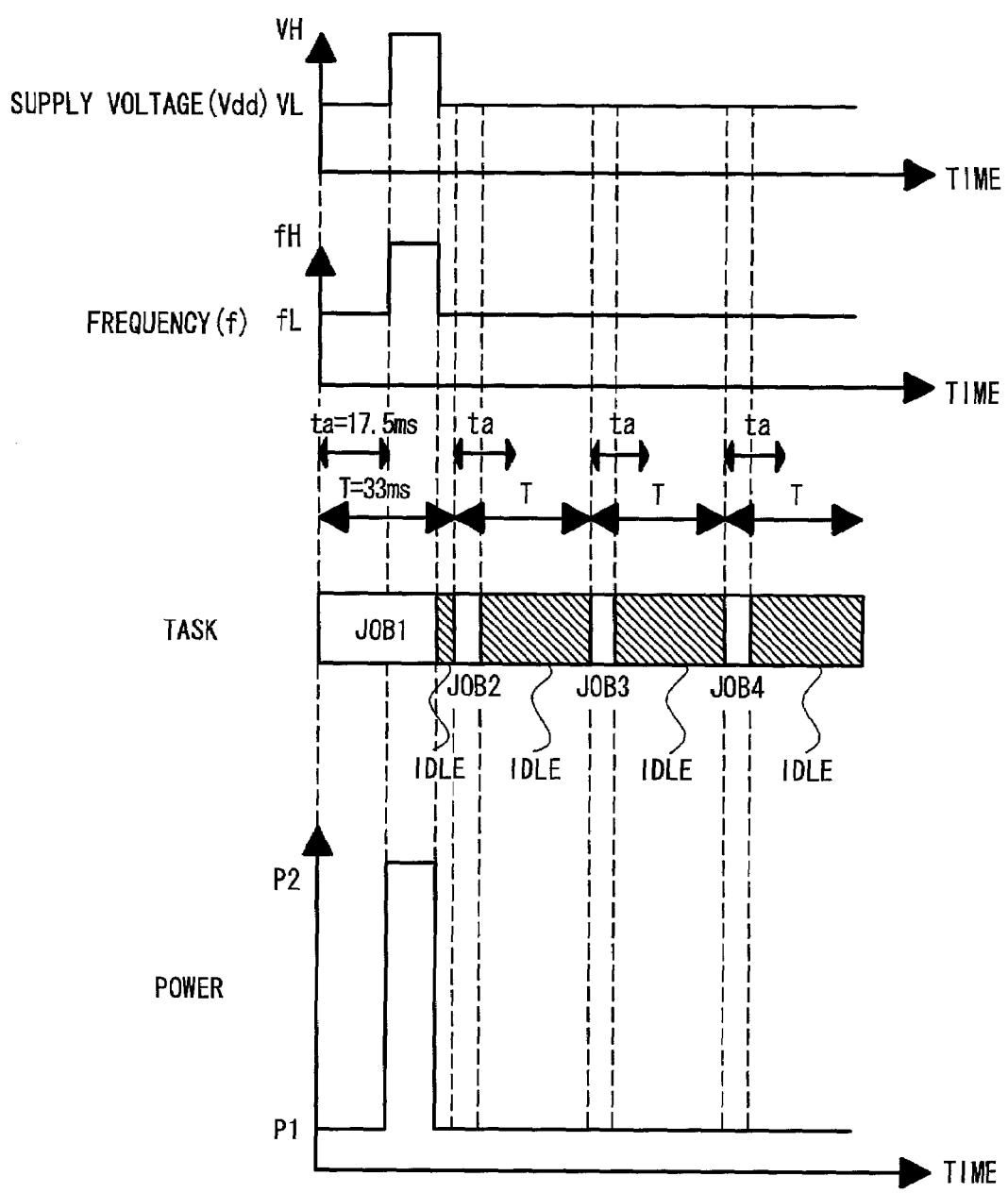
FIG. 10 is a waveform to show the supply voltage-frequency control of the present invention that is applied to the specific application.

FIG. 10 is a waveform to show the supply voltage-frequency control of the present invention that is applied to the specific application, which is an example to concretely explain the effect of the invention.

In recent years, the movie decode and encode have come to be performed in the hand-held equipments such as a portable phone. The decoding and encoding of the movie by means of the microprocessor is characterized in that jobs are periodically executed and most of the jobs are of low load while occasionally there exist jobs that require a great deal of calculation.

For instance, when the MPEG data at 30 frames/s are decoded, the job execution period amounts to 33 ms. The MPEG data compression method, the first movie frame of which data is compressed information as a whole so as to require pretty much calculation for decoding the same. On the other hand, there exists continuity among the movie frames for a while after the second frame, which only requires the calculation of the difference between the anterior frame and the posterior one so as to make such calculation less demanding. This characteristic is shown in the drawing.

The first frame is processed at the job 1, which frame is to begin with processed at the frequency fL and the supply voltage VL, but after the time ta has passed, which frame continues being processed to the end with the change of the frequency and the supply voltage into fH and VH, respectively, as the job 1 involves a great deal of calculation. Here, the frequency fL amounts to one half of that fH while the time ta amounting to one half of the period T (33 ms) or 17.5 ms. The operating frequency up to the time ta is equal to one half of the fH while that during the time from ta to T corresponds to the fH, so that the average operating frequency at the period T amounts to three-fourths of the fH. Accordingly, provided that the frequency fH is the maximum operating speed available to the microprocessor, the processor operates at 75% of the same on average.

On the other hand, the calculation of the second frame processed by the job 2, that of the third frame processed by the job 3 and that of the fourth frame processed by the job 4 are of low load, which calculations are over within the time ta. Accordingly, the frequency fL and the supply voltage VL are maintained for the calculations of the second frame and the subsequent frames, the power required for the calculations of which frames is restrained to one-eighth or 12.5% of the maximum power available to the processor. In this way, the present invention allows the low power mode of the processor to be restrained to 12.5% of the maximum power while the processor to operate at the 75% of the maximum operating frequency.

Figure 11:
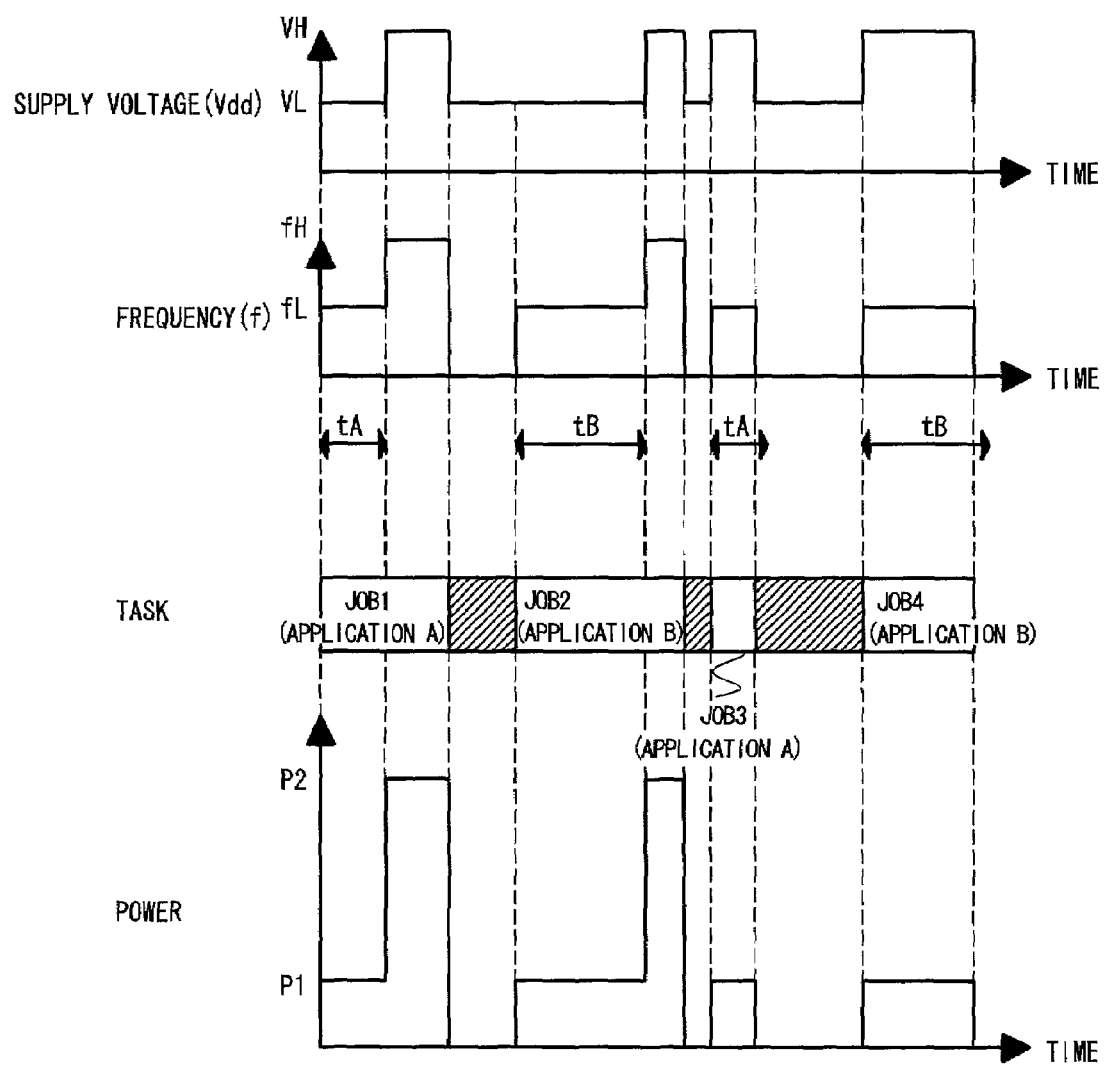
FIG. 11 is a waveform to show where a plurality of applications run simultaneously on a CPU by means of a multitask OS.

FIG. 11 is a waveform to show where a plurality of applications run simultaneously on a CPU by means of a multitask OS.

In the case of the multitask OS, the applications are divided into jobs, which jobs are executed by the processor. The calculation of the respective jobs depends on the nature of the applications. For instance, where the applications are respectively involved with the decoding of the compressed movie and that of the compressed voice, the former decoding requires much greater calculation than the latter so that it is predicted that it takes longer time for the jobs as divided for the former application to complete. On the other hand, the decoding of the movie has large inconsistency in length of time per jobs. In this case, given that the time required for changing the frequency and the supply voltage of the processor in the application for decoding the movie is set comparatively longer, most of the jobs thereof end before such set time being spent so as to contribute to the low power consumption.

In the example as shown in FIG. 11, the jobs 1 and 3 correspond to the application A while the jobs 2 and 4 correspond to the application B. Here, a shorter set time tA is applied to the job 1 of the application A while to the jobs of the application B a longer set time tB is applied. In this way, in the case of the multitask OS, the low power consumption is effectively achieved by arranging the set time in accordance with the nature of the respective applications.

In this case, the information on the set time of tA and tB, respectively is required for the ta register as shown in FIGS. 2, 3, 5 and 7.

Figure 12:
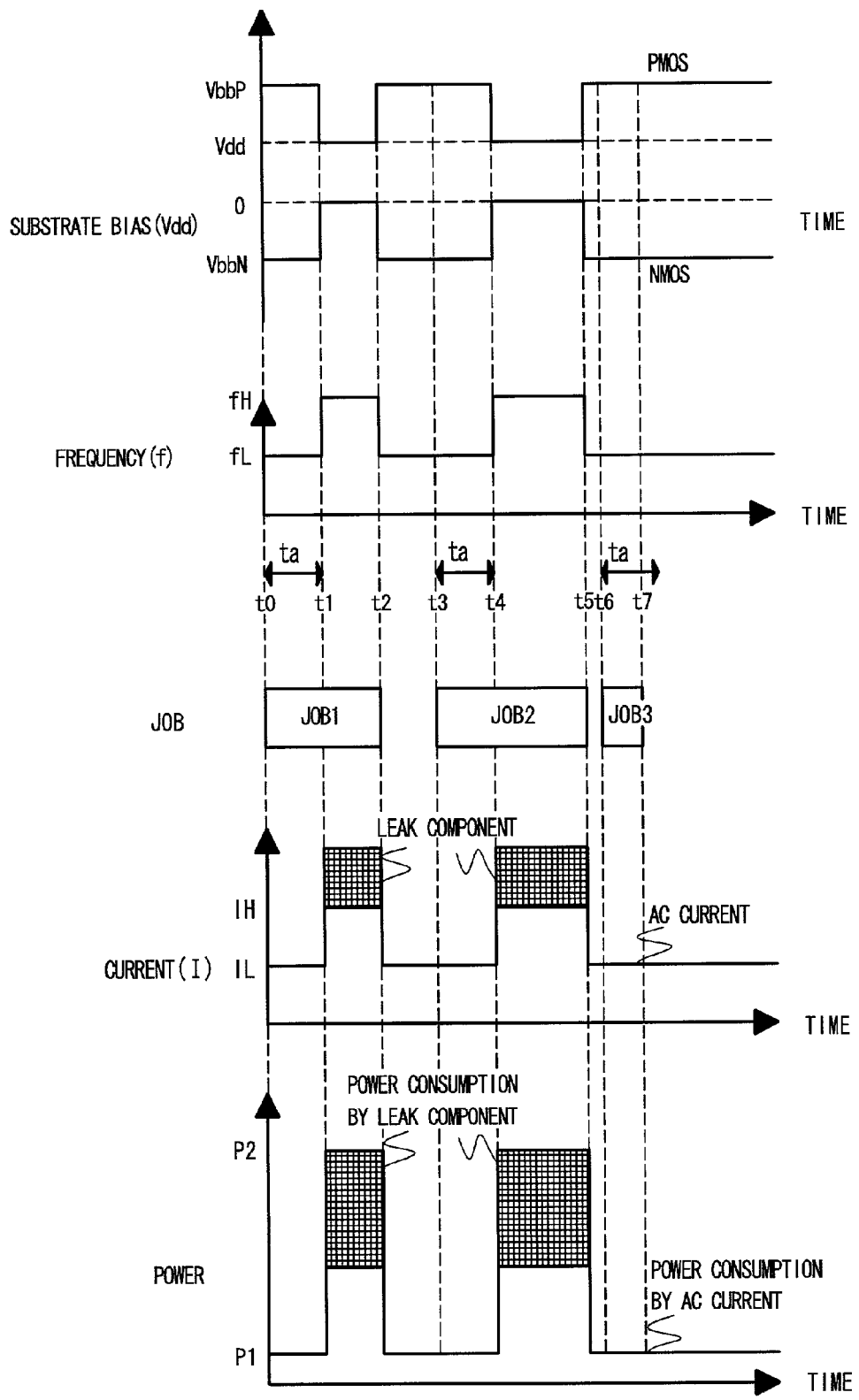
FIG. 12 is a waveform to show an example of the substrate bias-frequency control according to the second embodiment of the present invention.

FIG. 12 is a waveform to show an example of the substrate bias-frequency control according to the second embodiment of the present invention, in which the supply voltage is constant.

In the example as shown in FIG. 12, at the start of the jobs, a low frequency fL and a deep substrate bias are supplied to the processor. Thereafter, a high frequency fH and a shallow substrate bias are supplied thereto, after the time ta has passed. For such deep substrate bias, VbbNV is applied to the substrate or well of the NMOS transistor while VbbPV is applied to the substrate or well of the PMOS transistor, which transistors comprises a processor. For such shallow substrate bias, the substrate potential having an absolute value smaller than that of the potential as applied for such deep substrate bias is applied. For instance, 0V is applied to the substrate or well of the NMOS transistor while the supply voltage (Vdd) is applied to the substrate or well of the PMOS transistor.

Where the deep substrate bias is applied, the threshold voltage goes up so as to lower the operating frequency of the processor, in which the decrease of leak current leads to the reduction of the power consumption. On the other hand, where the shallow substrate bias is applied, the threshold voltage goes down so as to raise the operating frequency thereof, in which the increase of leak current leads to that of the power consumption. Such relation between the operating speed and the power consumption thereof is the same as in the case where the frequency and the supply voltage thereof are controlled. Accordingly, the example as shown in FIG. 12 realizes a highly generalized frequency control method so s to allow the microprocessor to operate in lower power consumption, but with higher performance.

It should be noted that the above embodiment is also realized by the hardware arrangements as shown in FIGS. 2, 3, 5 and 7. That is to say, a substrate bias generation circuit is provided therein instead of the power supply circuit so as to generate the substrate bias as shown in FIG. 12.

Further, the first embodiment exemplifies the supply voltage-frequency control of the processor, which control may be carried out only for the frequency thereof, though the effect of the lower power consumption is inferior to that of the first embodiment, and whereas the hardware arrangement thereof is streamlined.

This alternative is realized by excluding the control system for the power supply circuit from the hardware arrangements as shown in FIGS. 2, 3, 5 and 7.

The present invention realizes a highly generalized frequency control of the processor without depending on the OS so as to allow the microprocessor to operate in lower power consumption, but with higher performance.

What is claimed is:

1. A semiconductor device comprising:
a processor for executing a plurality of jobs, each said job including a set of instructions that are sequentially executed by the processor; and
a control unit for controlling an operating mode of said processor,
wherein said control unit sets the operating mode of said processor to a first mode when said processor starts to execute each said job,
wherein said control unit sets the operating mode of said processor to a second mode upon an elapse of a predetermined time during execution of each said job until each said job ends,
wherein said processor executes each said job at a first operating frequency in said first mode, and
wherein said processor executes each said job at a second operating frequency higher than said first operating frequency in said second mode.

2. A semiconductor device according to claim 1,
wherein said processor executes each said job at a first supply voltage in said first mode, and
executes each said job at a second supply voltage higher than said first supply voltage in said second mode.

3. A semiconductor device according to claim 1,
wherein a first substrate potential is applied to one of a substrate and a well of each transistor comprising said processor in said first mode, and
wherein a second substrate potential having an absolute value smaller than an absolute value of said first substrate potential is applied to one of the substrate and the well of said each transistor in said second mode.

4. A semiconductor device according to claim 1,
wherein said control unit comprises a control circuit for controlling the operating mode of said processor and a first register to store information regarding said predetermined time.

5. A semiconductor device according to claim 4,
wherein said information regarding said predetermined time is transferred from an external memory device to said first register upon one of a power supply switch-on and a resetting of a circuit system.

6. A semiconductor device according to claim 4,
wherein said processor finishes executing each said job such that a pointer indicates an idle address,
wherein said control unit comprises a second register for storing said idle address and a comparator to compare said idle address as stored in said second register with said pointer,
wherein said idle address is transferred from an external memory device to said second register upon one of a power supply switch-on and a resetting of the circuit system, and
wherein said control circuit receives an output signal from the comparator to indicate that said idle address as stored in said second register does not correspond with said pointer so as to determine that said processor has started to execute each said job.

7. A semiconductor device according to claim 4, comprising a clock signal distribution circuit for supplying a clock signal to said processor,
wherein said processor outputs a control signal to control a distribution of said clock signal thereto, and
wherein said control circuit determines that said processor has started to execute each said job in accordance with said control signal.

8. A semiconductor device according to claim 1,
wherein said processor executes a first said job corresponding to a first application and a second said job corresponding to a second application,
wherein said control unit changes the operating mode of said processor from said first mode to said second mode upon an elapse of a first time after said processor has started to execute the first said job,
wherein said control unit changes the operating mode of said processor from said first mode to said second mode upon an elapse of a second time different from said first time after said processor has started to execute the second said job, and
wherein the operating mode of said processor is returned from said second mode to said first mode when execution of said first job has been completed and when execution of said second job has been completed.

9. A semiconductor device comprising:
a processor for executing a plurality of jobs, each said job including a set of instructions that are sequentially executed by the processor; and
a control unit for controlling an operating mode of said processor,
wherein said control unit sets the operating mode of said processor to a first mode when said processor starts to execute each said job, and, if execution of said job has not been completed after an elapse of a predetermined time, said control unit sets the operating mode of said processor to a second mode having a higher operating speed than said first mode until said job ends, wherein said processor executes each said job at a first operating frequency in said first mode, and wherein said processor executes each said job at a second operating frequency higher than said first operating frequency in said second mode.

10. A semiconductor device comprising:

a processor for executing jobs, said jobs including a respective series of instructions that are sequentially executed by the processor; and a control unit for controlling an operating mode of said processor, wherein said control unit sets the operating mode of said processor to a first mode when said processor starts to execute each said job, wherein if a job being executed has not been completed after an elapse of a predetermined time, said control unit sets the operating mode of said processor to a second mode until the job ends, wherein said processor executes at a first operating frequency in said first mode, and wherein said processor executes at a second operating frequency higher than said first operating frequency in said second mode.

11. A semiconductor device according to claim 10, wherein said processor executes at a first supply voltage in said first mode, and executes at a second supply voltage higher than said first supply voltage in said second mode.

12. A semiconductor device according to claim 10, wherein a first substrate potential is applied to one of a substrate and a well of each transistor comprising said processor in said first mode, and wherein a second substrate potential having an absolute value smaller than an absolute value of said first substrate potential is applied to one of the substrate and the well of said each transistor in said second mode.

13. A semiconductor device according to claim 10, wherein said control unit comprises a control circuit for controlling the operating mode of said processor and a first register to store information regarding said predetermined time, and wherein said information regarding said predetermined time is transferred from an external memory device to said first register upon one of a power supply switch-on and a resetting of a circuit system.

14. A semiconductor device according to claim 13, wherein said processor finishes executing the given job such that a pointer indicates an idle address, wherein said control unit comprises a second register for storing said idle address and a comparator to compare said idle address as stored in said second register with said pointer, wherein said idle address is transferred from an external memory device to said second register upon one of a power supply switch-on and a resetting of the circuit system, and wherein said control circuit receives an output signal from the comparator to indicate that said idle address as stored in said second register does not correspond with said pointer so as to determine that, said processor has started to execute a job.

15. A semiconductor device according to claim 13, comprising a clock signal distribution circuit for supplying a clock signal to said processor, wherein said processor outputs a control signal to control a distribution of said clock signal thereto, and wherein said control circuit determines that said processor has started to execute each said job in accordance with said control signal.

16. A semiconductor device according to claim 10, wherein said processor executes a first said job corresponding to a first application and a second said job corresponding to a second application, wherein said control unit changes the operating mode of said processor from said first mode to said second mode upon an elapse of a first time after said processor has started to execute the first said job, wherein said control unit changes the operating mode of said processor from said first mode to said second mode upon an elapse of a second time different from said first time after said processor has started to execute the second said job, and wherein the operating mode of said processor is returned from said second mode to said first mode when execution of said first job has been completed and when execution of said second job has been completed.

* * * * *